(12) United States Patent
Yang

(10) Patent No.: US 12,685,625 B2
(45) Date of Patent: Jul. 21, 2026

(54) ELECTRIC ORAL CLEANING TOOL

(71) Applicant: Jixi Yang, Dongguan (CN)

(72) Inventor: Jixi Yang, Dongguan (CN)

(*) Notice: Subject to any disclaimer, the term of this patent is extended or adjusted under 35 U.S.C. 154(b) by 0 days.

(21) Appl. No.: 19/278,562

(22) Filed: Jul. 23, 2025

(65) Prior Publication Data

US 2025/0345161 A1     Nov. 13, 2025

Related U.S. Application Data

(63) Continuation of application No. PCT/CN2024/119455, filed on Sep. 18, 2024.

(30) Foreign Application Priority Data

Nov. 30, 2023    (CN) .......................... 202323256975.4
Feb. 6, 2024    (CN) .......................... 202420285135.6

(51) Int. Cl.
| | |
|---|---|
| *A61C 17/34* | (2006.01) |
| *A46B 13/00* | (2006.01) |
| *A46B 13/02* | (2006.01) |
| *A46B 5/00* | (2006.01) |

(52) U.S. Cl.
CPC ........ *A61C 17/3436* (2013.01); *A46B 13/008* (2013.01); *A46B 13/023* (2013.01); *A61C 17/3409* (2013.01); *A46B 5/0095* (2013.01)

(58) Field of Classification Search
CPC . A61C 17/3436; A61C 17/3409; A61C 17/32; A46B 13/023; A46B 13/008
See application file for complete search history.

(56) References Cited

U.S. PATENT DOCUMENTS

| | | | | |
|---|---|---|---|---|
| 5,524,317 A | * | 6/1996 | Nagahama | ........... D06N 7/0094 |
| | | | | 428/95 |
| 8,631,532 B2 | * | 1/2014 | Utsch | ................. A61C 17/3436 |
| | | | | 15/28 |
| 2015/0150662 A1 | * | 6/2015 | Kressner | ............ A61C 17/3436 |
| | | | | 15/22.1 |

FOREIGN PATENT DOCUMENTS

| | | | | |
|---|---|---|---|---|
| JP | 2017205438 A | * | 11/2017 | ............. A61C 17/34 |

* cited by examiner

*Primary Examiner* — Laura C Guidotti
(74) *Attorney, Agent, or Firm* — HOWARD M COHN and Associates, LLC

(57) ABSTRACT

An electric oral cleaning tool, including: a housing, a transmission rod, and a brush head assembly. The brush head assembly is rotatably connected to an end of the housing, and a functional element is arranged on a side of the brush head assembly; a movable disk is arranged on another side of the brush head assembly, and the movable disk has a mating area offset from a center of the brush head assembly. The transmission rod is arranged in the housing and has an input end and an output end; the input end is configured to be connected to a transmission mechanism, and the output end is matched with the mating area; in condition of the output end moving with a variable diameter relative to a center of the movable disk, the output end drives the mating area and the brush head assembly to rotate.

12 Claims, 13 Drawing Sheets

A-A

ELECTRIC ORAL CLEANING TOOL

CROSS REFERENCE TO RELATED APPLICATIONS

The present disclosure is a continuation application of International application No. PCT/CN2024/119455, filed on Sep. 18, 2024, which claims priority to Chinese Patent Application No. 202323256975.4 filed on Nov. 30, 2023 with the Chinese Patent Office, and Chinese Patent Application No. 202420285135.6 filed on Feb. 6, 2024 with the Chinese Patent Office, the disclosures of which are incorporated herein by reference in their entireties.

TECHNICAL FIELD

The present disclosure relates to the technical field of toothbrushes, and specifically to an electric oral cleaning tool.

BACKGROUND

Electric toothbrushes, as a common oral cleaning tool nowadays, are mainly divided into sonic toothbrushes and rotary toothbrushes. The sonic toothbrush heads mainly use left and right high-frequency oscillation to achieve vibration cleaning, while the rotary toothbrush heads mainly use left and right high-frequency rotation to achieve efficient cleaning with better cleaning results.

For the common rotary electric toothbrushes on the market, power is transmitted to the handle through a transmission structure that oscillates eccentrically from side to side, and then from the handle to the brush head through multiple parts, requiring multiple structural assemblies and coordination, which not only increases the difficulty of assembly and production, but also easily leads to poor consistency in the amplitude of the brush head. After long-term use, the gap between the parts increases, which may further lead to louder noise and attenuation of the amplitude, affecting the cleaning effect and user experience.

SUMMARY OF THE DISCLOSURE

In view of this, the present disclosure provides an electric oral cleaning tool to solve the problem of affected cleaning effect and user experience after prolonged use of electric toothbrushes in the related art, caused by poor consistency.

To achieve one or some or all of the above purposes or other purposes, the present disclosure proposes an electric oral cleaning tool, including: a housing, a transmission rod, and a brush head assembly; the present disclosure also proposes an electric toothbrush, including the electric oral cleaning tool;

wherein the brush head assembly is rotatably connected to an end of the housing, and a functional element is arranged on a side of the brush head assembly; a movable disk is arranged on another side of the brush head assembly, and the movable disk has a mating area offset from a center of the brush head assembly;

the transmission rod is arranged in the housing and has an input end and an output end; the output end is eccentrically arranged relative to the input end in an axial direction of the transmission rod; the input end is configured to be connected to a transmission mechanism, and the output end is matched with the mating area; in condition of the output end reciprocating with a variable diameter relative to a center of the movable disk, the output end drives the mating area and the brush head assembly to oscillate reciprocally; the variable diameter refers to a fact that a distance between the output end and the center of the movable disk changes during the reciprocating of the output end;

the transmission rod or at least the input end is integrally formed;

the transmission rod or at least the input end is made of magnetizable material.

In some embodiments, the mating area is a groove, and the output end is arranged with a guide rod; the guide rod is disposed in the groove; a distance between the guide rod and the center of the brush head assembly is 2 mm-4 mm.

In some embodiments, the guide rod extends with a connecting block at an end away from the brush head assembly, and an inner side of the housing defines a limit groove; the connecting block is disposed in the limit groove and is movable longitudinally in the limit groove.

In some embodiments, the mating area is a fixing rod, and the output end defines a connecting hole; the fixing rod is disposed in the connecting hole; in condition of the connecting hole moving longitudinally, the fixing rod moves transversely in the connecting hole.

In some embodiments, the output end is connected to the input end by means of a bending, a welding, or a fitting, and a projection of the output end is "L"-shaped or "T"-shaped or grooved shape.

In some embodiments, the transmission rod or at least the input end is made of a plastic material mixed with magnetic powder.

In some embodiments, a guide ring is fixed to an inner wall of the housing, and the transmission rod passes through the guide ring and is capable of reciprocating longitudinally within the guide ring.

In some embodiments, a maximum longitudinal travel of the transmission rod is 1-5 mm, and a rotation angle of the brush head assembly is between −38° and 38°.

In some embodiments, a magnetic adsorption force of the output end is between 3.5N and 35N.

In some embodiments, a minimum distance between a center point of the guide rod and a central axis of the input end is 1.5-4.5 mm.

The implementation of the embodiments of the present disclosure will have the following beneficial effects.

In the electric oral cleaning tool as proposed, the transmission rod is integrally formed, which can drive the movement of the groove when reciprocating longitudinally in the groove. Since the rotating shaft and the limit structure limit the movable disk, the movable disk can only rotate back and forth on a vertical plane, driving the functional element provided on the brush head assembly to rotate. The transmission structure transmits power to the movable disk via the transmission rod, with few parts required and thus less energy loss during transmission. Further, the increased gap between parts has less of an impact on the entire transmission process. Therefore, even after long-term use, the noise and swing range will not be greatly affected.

BRIEF DESCRIPTION OF THE DRAWINGS

In order to more clearly illustrate the embodiments of the present disclosure or the technical solutions in the related art, the following provides a brief description of the drawings for use in the description of the embodiments or the related art. Obviously, the drawings in the following description are just some embodiments of the present disclosure.

For those skilled in the art, without investing creative effort, other drawings can be obtained based on these drawings.

REFERENCE NUMERALS

1, housing; 12, limit groove; 13, guide ring;

2, transmission rod; 21, guide rod; 211, connecting block; 22, connecting hole;

3, brush head assembly; 31, functional element; 32, movable disk; 321, groove; 322, receiving slot; 33, limit structure; 34, rotating shaft; 35, fixing rod;

4. handle;

5. transmission mechanism; 51. driving gear; 52. driven gear; 53. transmission rod; 54. sleeve; 55. eccentric post; 56. rotating shaft; 57. magnetic connecting portion;

6. motor;

7. battery.

DETAILED DESCRIPTION

Unless otherwise defined, all technical and scientific terms used herein shall have the same meaning as commonly understood by those skilled in the art. The terms used herein in the description of the present disclosure are for the sole purpose of describing specific embodiments and are not intended to limit the same. The terms "including" and "having" and any variations thereof in the description, claims, and aforementioned description of the drawings of the present disclosure are intended to cover non-exclusive inclusion. The terms "first," "second," etc., in the description and claims of the present disclosure or in the above-mentioned drawings are intended to distinguish different objects, not to describe a specific order.

References herein to "embodiments" mean that the particular feature, structure, or characteristic described in conjunction with an embodiment may be included in at least one embodiment of the present disclosure. The occurrence of the phrase at various locations in the description does not necessarily refer to the same embodiment, nor is it a separate or alternative embodiment that is mutually exclusive from other embodiments. It is expressly and implicitly understood by those skilled in the art that the embodiments described herein can be combined with other embodiments.

In order to better enable those skilled in the art to understand the present disclosure, the following will clearly and completely describe the technical solution of the embodiments of the present disclosure in conjunction with the accompanying drawings.

Referring to FIGS. 1 to 6, the present disclosure proposes an electric oral cleaning tool, including a housing 1, a transmission rod 2, and a brush head assembly 3.

Figure 1:
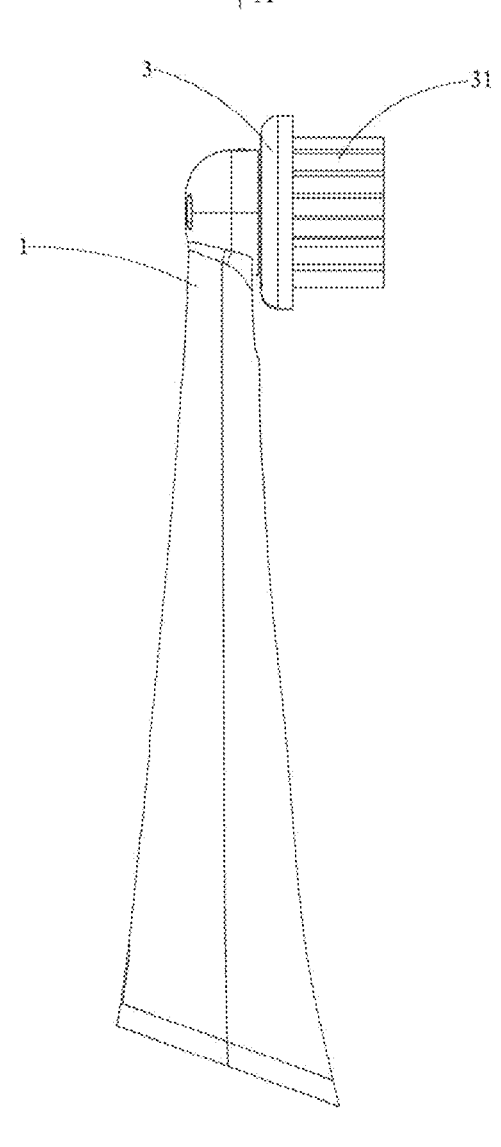
FIG. 1 is a side view of an electric oral cleaning tool according to some embodiments of the present disclosure.
Figure 2:
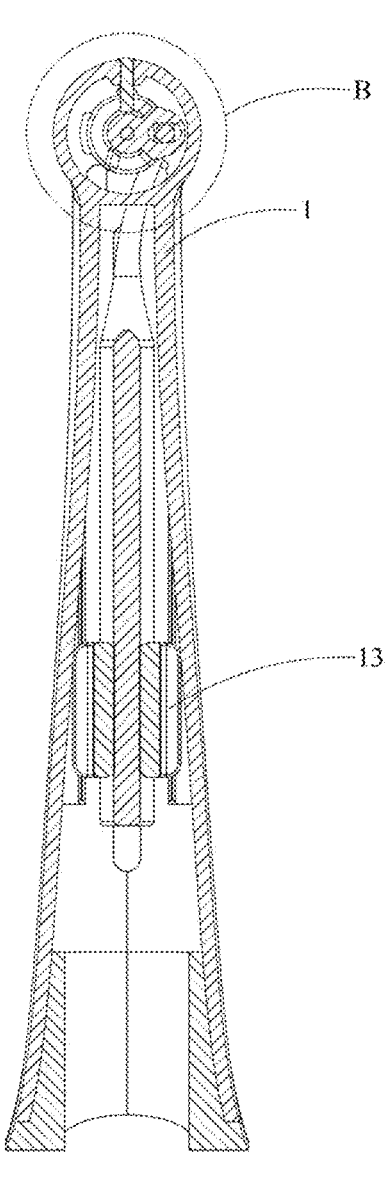
FIG. 2 is a cross-sectional view along A-A in FIG. 1.
Figure 3:
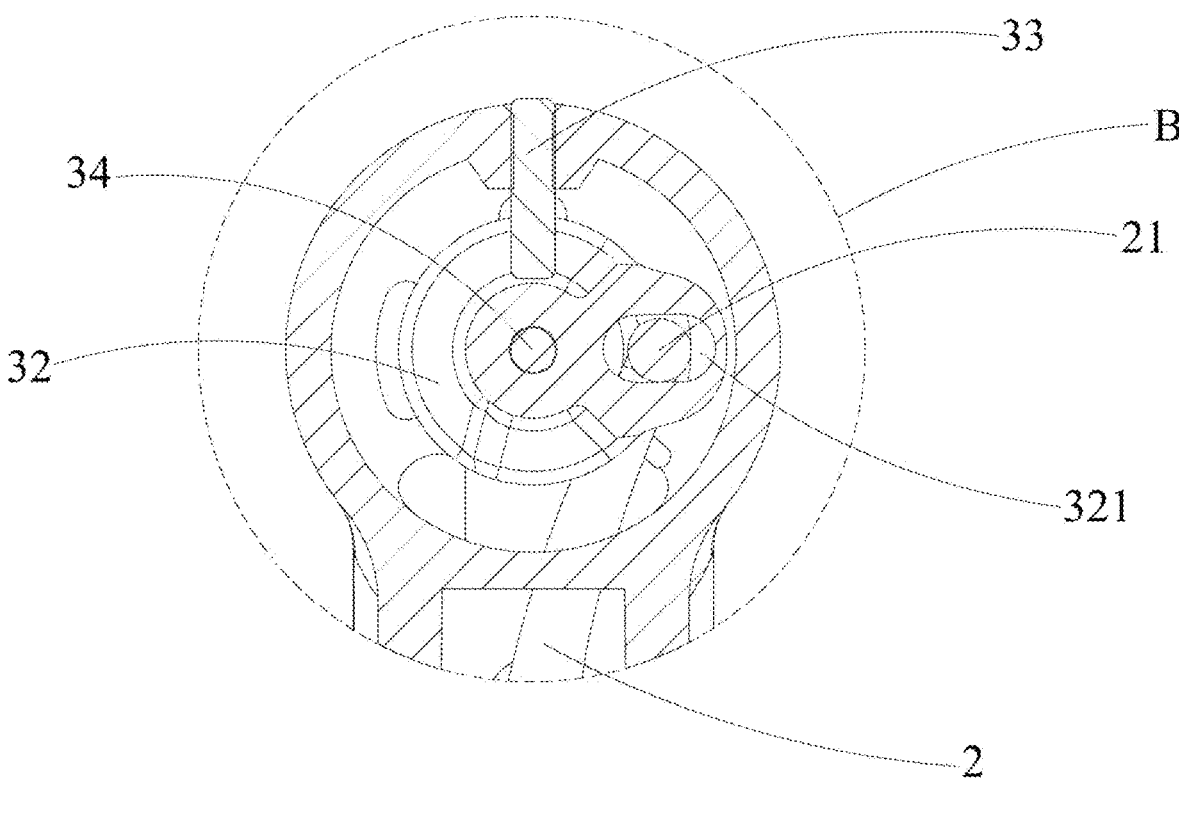
FIG. 3 is an enlarged view of area B circumscribed in FIG. 2.
Figure 4:
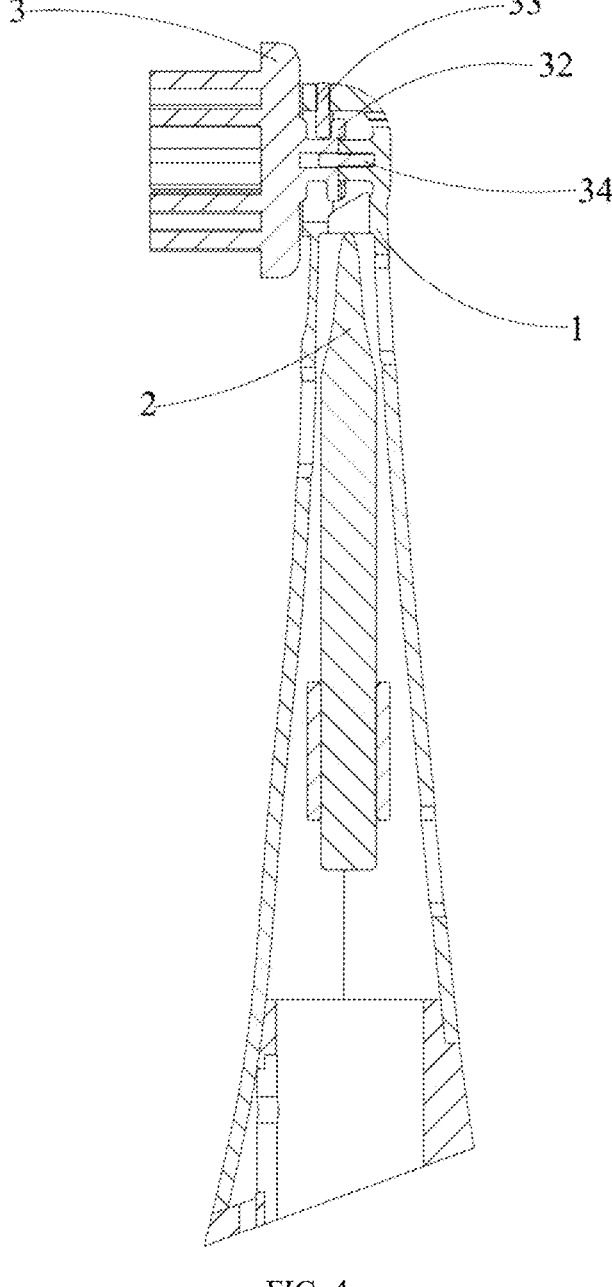
FIG. 4 is another cross-sectional view of an electric oral cleaning tool according to some embodiments of the present disclosure.
Figure 5:
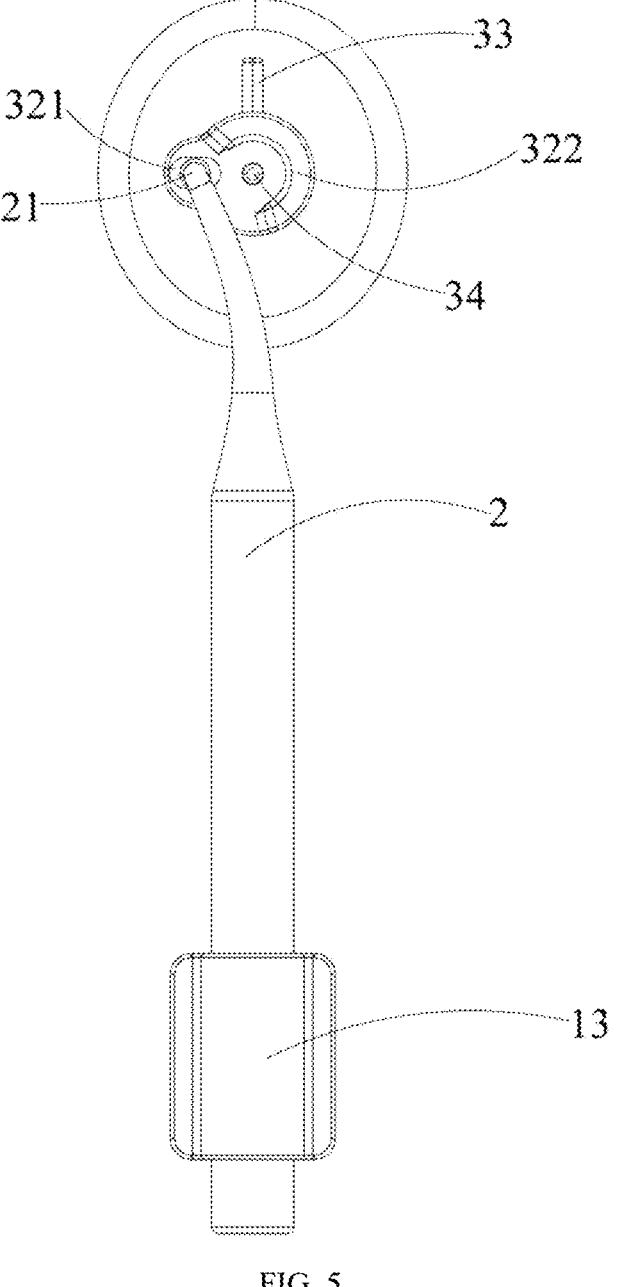
FIG. 5 is a structural schematic view of an electric oral cleaning tool, according to some embodiments of the present disclosure, where a housing is not illustrated.
Figure 6:
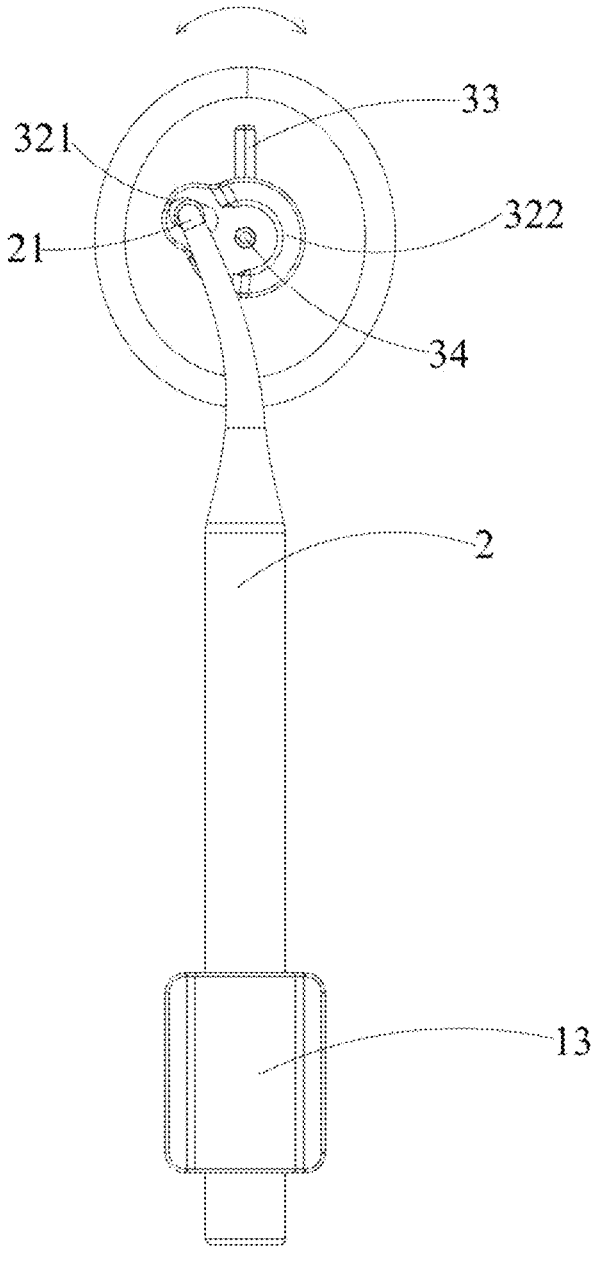
FIG. 6 is a schematic diagram of a working state of an electric oral cleaning tool, according to some embodiments of the present disclosure, where a housing is not illustrated.
Figure 10:
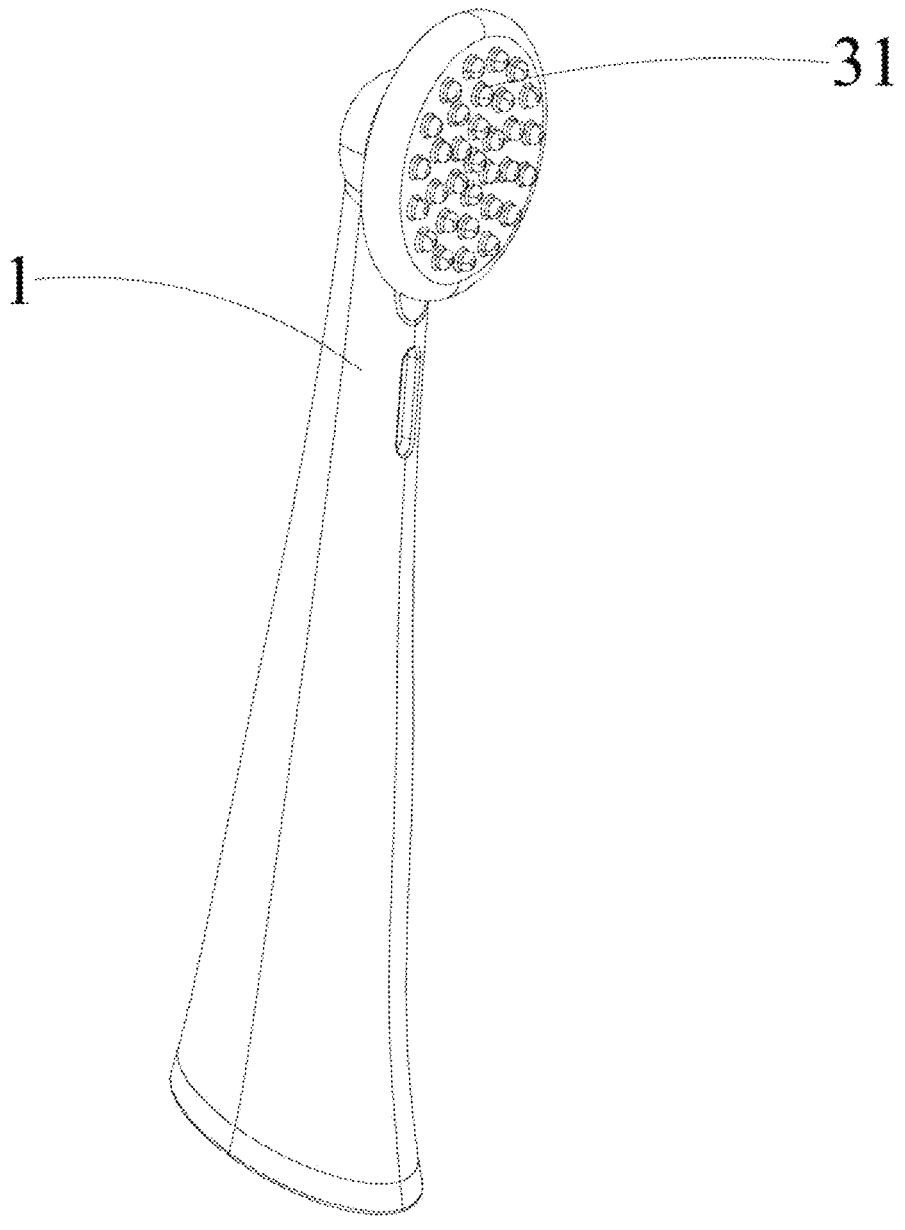
FIG. 10 is a structural schematic view of an electric oral cleaning tool according to some embodiments of the present disclosure.

The brush head assembly 3 is rotatably connected to an end of the housing 1, and a functional element 31 is arranged on a side of the brush head assembly 3. The functional element 31 may include multiple groups of bristles as shown in FIG. 1, or it may be other components, such as a tongue coating cleaner or a soft rubber cleaner. For example, as shown in FIG. 10, illustrated is a tongue coating cleaning brush head, in which case the electric oral cleaning tool is applied as a tongue coating cleaner. Specifically, a movable disk 32 is arranged on another side of the brush head assembly 3, and the movable disk 32 has a mating area, which is offset from a center of the brush head assembly 3. The transmission rod 2 is arranged in the housing 1 and has an input end and an output end. The input end of the transmission rod 2 is configured to be connected to a transmission mechanism and is cylindrical or substantially cylindrical, such as elliptical cylindrical, etc. The input end of the transmission rod 2 extends into a cavity of the housing. At least at the input end is integrally formed. The output end of the transmission rod 2 is an end close to the brush head assembly 3, including a guide rod 21 or a connecting hole 22 adapted to the mating area, and a connecting rod for connecting the guide rod 21 or the connecting hole 22 with the input end; where the shortest distance between a center of the guide rod 21 and a central axis of the input end is 1.5-4.5 mm, and the distance between the guide rod 21 and the center of the brush head assembly 3 is 2 mm-4 mm. In addition, the output end and the input end may be integrally formed by bending, and a connecting block 211 may be further welded or riveted to the output end. It is noted that the output end is eccentrically arranged relative to the input end in the axial direction of the transmission rod 2. The input end is configured to be connected to the transmission structure, and the output end is matched with the mating area. When the output end reciprocates with a variable diameter relative to a center of the movable disk, it drives the mating area and the brush head assembly 3 to oscillate reciprocally; the variable diameter refers to the fact that the distance between the output end and the center of the movable disk 32 changes during the reciprocating motion. The output end of the transmission rod 2 is adaptively connected to the mating area, and when the output end reciprocates longitudinally, it drives the mating area to rotate together with the brush head assembly 3. When the housing 1 is inserted into the toothbrush handle, a top end of the transmission mechanism in the toothbrush handle is connected to the transmission rod 2 by magnetic attraction and drives the transmission rod 2 to reciprocate longitudinally. The transmission mechanism may be an existing structure, which will not be described in detail herein. The movement trajectory of the transmission rod 2 is perpendicular to the horizontal line, such that the output end moves at a variable distance relative to the center of the movable disk, that is, during the movement, the distance from the output end to the center of the movable disk is constantly changing. A lower end of the transmission rod 2 is arranged close to the transmission structure and is symmetrically arranged about a longitudinal central axis of the brush head assembly 3. An upper end of the transmission rod 2 gradually deviates to one side. In the embodiments, the mating area is an elliptical-shaped groove 321, and the upper end of the transmission rod 2 is arranged with the guide rod 21, that is, a side projection of transmission rod 2 is similar to a "7" shape. The guide rod 21 is disposed in the groove 321. When the guide rod 21 reciprocates longitudinally with the transmission rod 2, the guide rod 21 drives the groove 321 to rotate. The elliptical-shaped groove 321 provides sufficient movement space for the guide rod 21. The longitudinal movement of the guide rod 21 drives the groove 321 to rotate around the central point of the brush head assembly 3. The brush head assembly 3 rotates together with the groove 321, and the direction of rotation is indicated by the arrow in FIG. 6. Taking the direction shown in FIG. 6 as an example, when the transmission rod 2 moves upward, the brush head assembly 3 rotates to the right, and when the transmission rod 2 moves downward, the brush head assembly 3 rotates to the left. The transmission structure drives the transmission rod 2 to move up and down at high frequency, and the brush head assembly 3 also rotates left and right at high speed, driving the functional element 31 on the other side of the brush head assembly 3 to rotate at high speed. Taking a toothbrush as an example, the cleaning of the teeth can thus be achieved. In addition, the brush head assembly 3 may be rotatably connected to an end of the housing 1. Specifically, a rotating shaft 34 may be inserted on the movable disk 32; the rotating shaft 34 may be arranged at the center of the brush head assembly 3; an end of the rotating shaft 34 may abut against the housing 1, and the rotating shaft 34 may be fixed to the interior of the movable disk 32 by assembly. The movable disk 32 drives the brush head assembly 3 to rotate together around the rotating shaft 34. A limit structure 33 is arranged on the movable disk 32, and the limit structure 33 is configured to axially limit the brush head assembly 3. As shown in FIG. 4, the movable disk 32 defines a longitudinally-opened receiving slot 322, and the housing 1 defines a longitudinal through hole. The limit structure 33 is inserted from the through hole into the receiving slot 322 and abuts against a side wall of the receiving slot 322, and the receiving slot 322 can rotate relative to the limit structure 33. The rotating shaft 34 prevents the movable plate 32 from moving in a horizontal or vertical direction, while the limit structure 33 prevents the movable plate 32 from moving in an extension direction of the rotating shaft 34, and the movable plate 32 can only rotate in a peripheral direction. In the embodiments, the limit structure 33 is a limiting pin.

Figure 9:
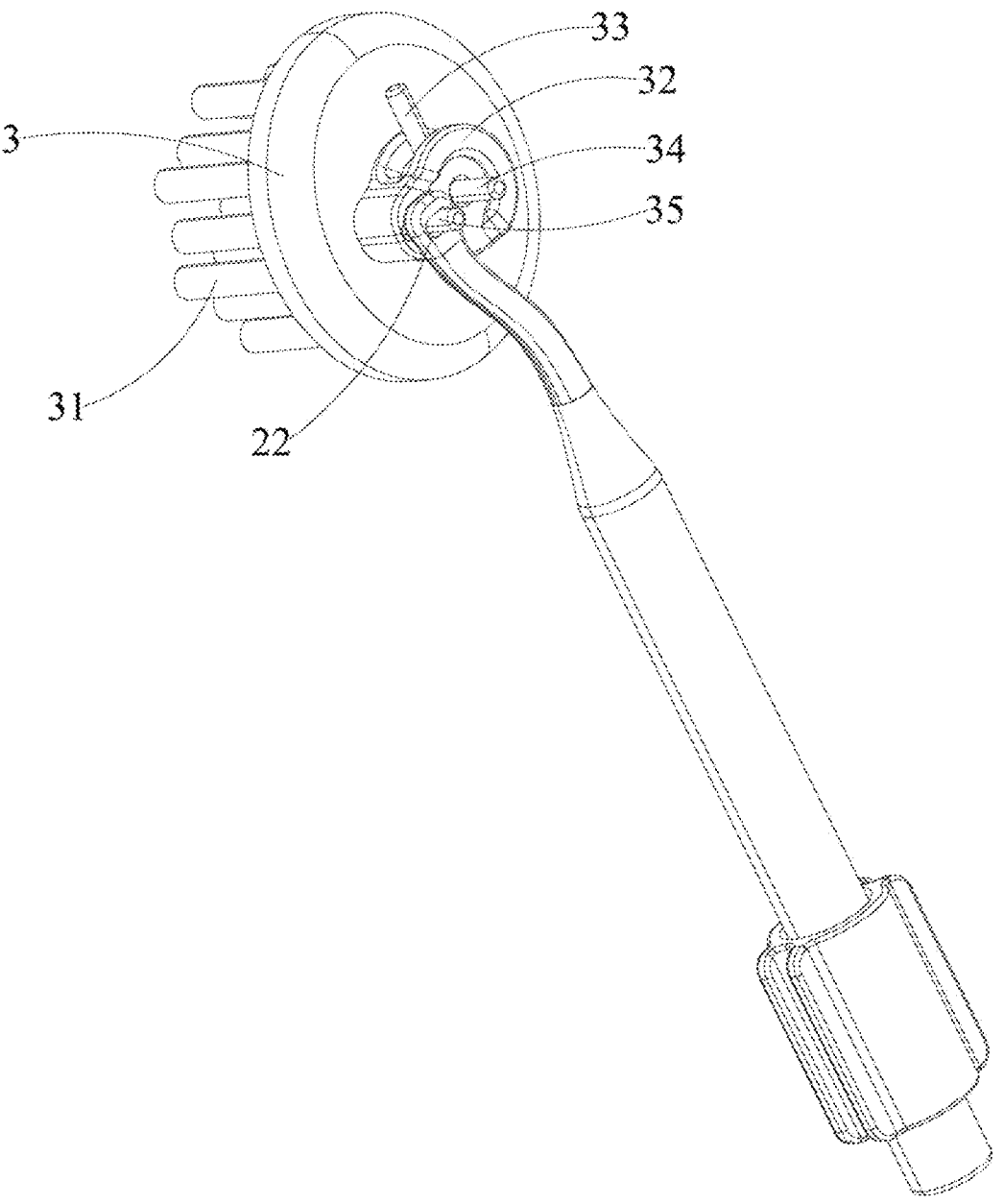
FIG. 9 is a structural schematic view of an electric oral cleaning tool, according to further other embodiments of the present disclosure, where a housing is not illustrated.

In other embodiments, as shown in FIG. 9, the mating area is a fixing rod 35 arranged on the movable disk, which is eccentrically arranged, and the output end defines the connecting hole 22. The fixing rod 35 is disposed in the connecting hole 22, which is also elliptical-shaped. When the connecting hole 22 moves longitudinally, the fixing rod

35 moves transversely in the connecting hole 22. The working principle is similar to the above embodiments and will not be repeated.

In the embodiments, a positive projection of the movable disk 32 is composed of two arcs sharing a common chord. The distance between the central point of the groove 321 and the central point of the brush head assembly 3 is equal to the distance between the central point of the brush head assembly 3 and an edge on the other side of the movable disk 32. It is also possible to make the former distance slightly greater than the latter distance. The greater the former distance, the longer the moment of the force that acts on the side wall of the groove 321 when the guide rod 21 moves upward, and the smaller the force required to drive the movable disk 32 to rotate, thus the more energy-saving it is. In addition, considering the size of the housing 1 and the stability of the transmission, it is preferable to make the former distance equal to the latter distance.

Figure 7:
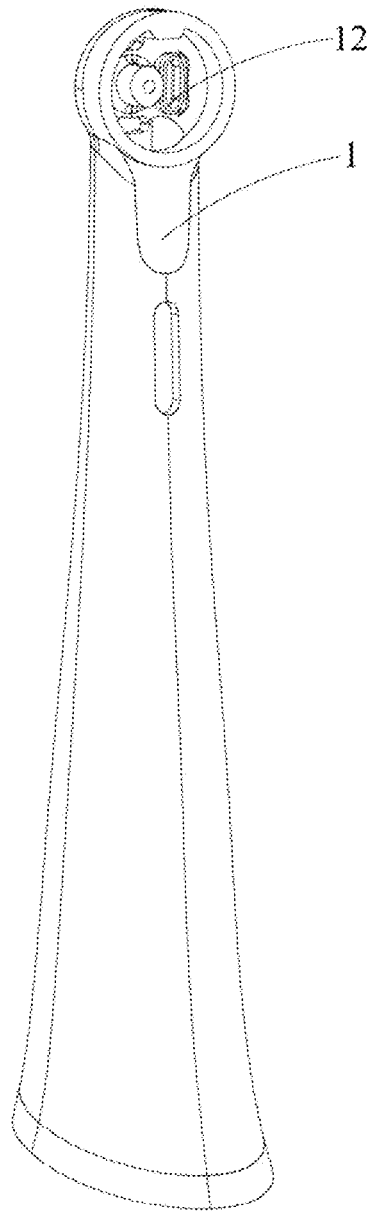
FIG. 7 is a structural schematic view of a housing of an electric oral cleaning tool according to other embodiments of the present disclosure.
Figure 8:
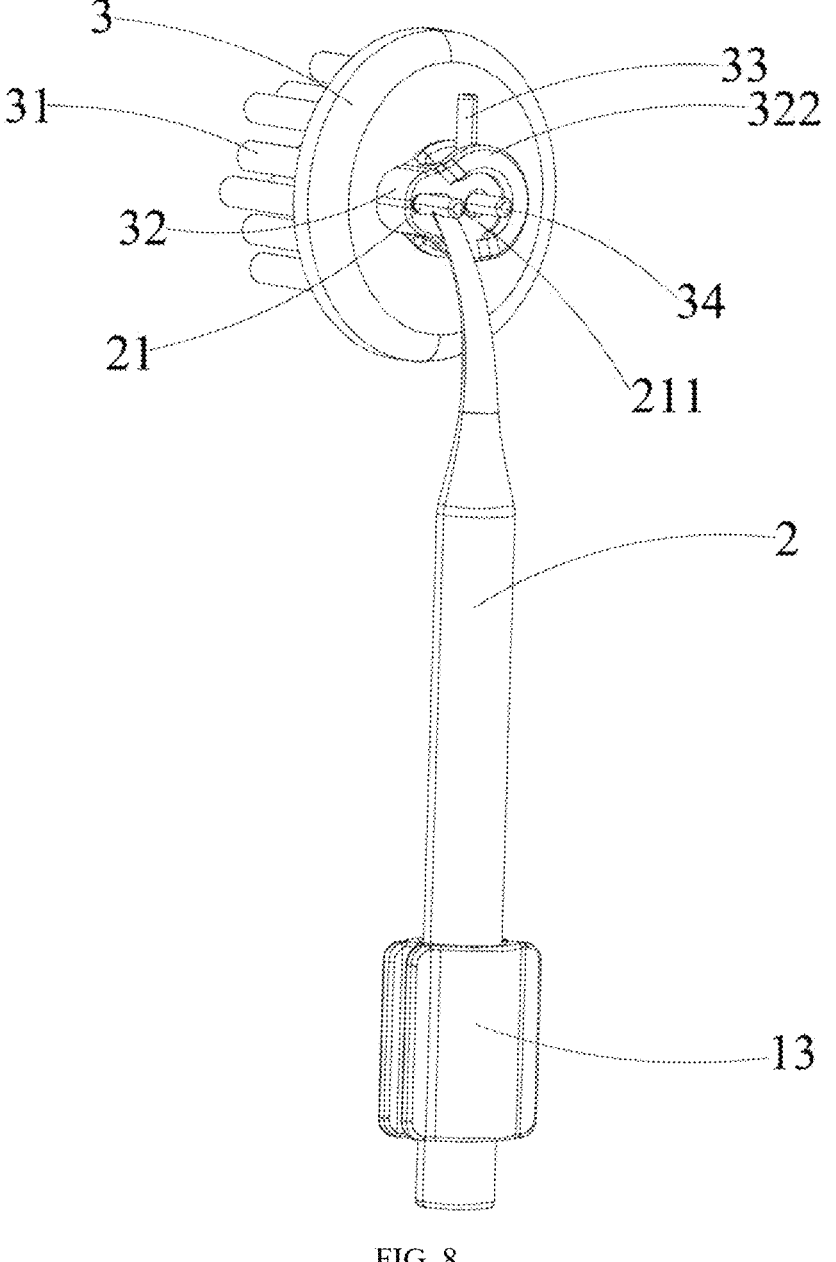
FIG. 8 is a structural schematic view of an electric oral cleaning tool, according to other embodiments of the present disclosure, where a housing is not illustrated.

In other embodiments, as shown in FIGS. 7 and 8, the guide rod 21 extends with a connecting block 211 at an end away from the brush head assembly 3, and the inner side of the housing 1 defines a limit groove 12. The connecting block 211 is disposed in the limit groove 12 and is movable longitudinally in the limit groove 12. Limiting the connecting block 211 via the limit groove 12 makes the transmission rod 2 less prone to wobbling, such that the distance between the rotating shaft 34 and the vertical line on which the movement trajectory of the guide rod 21 lies is always fixed. In the process, the distance between the guide rod 21 and the rotating shaft 34 is a variable distance and the maximum longitudinal travel of the transmission rod 2 is 1-5 mm. In some embodiments, this maximum travel is 1.5-3.5 mm, in which case the rotation angle of the brush head assembly 3 is between −38° and 38°, which can thoroughly clean the teeth.

In addition, a guide ring 13 is fixed to an inner wall of the housing 1, and the transmission rod 2 passes through the guide ring 13 and can reciprocate longitudinally within the guide ring 13. The guide ring 13 guides and limits the transmission rod 2, such that the transmission rod 2 does not deviate during movement. In the embodiments, an outer wall of the guide ring 13 is arranged with a symmetrical snap-fit block, and the inner wall of the housing 1 defines a symmetrical snap-fit groove in a corresponding position. The snap-fit block is adapted to the snap-fit groove, and after being snapped together, the position of the guide ring 13 is fixed and will not move with the movement of the transmission rod 2. The inner diameter of the guide ring 13 is consistent with the outer diameter of the input end of the transmission rod 2, which results in less friction and less loss during transmission, while preventing the transmission rod 2 from deflecting, such the use of the toll may be less affected.

In the embodiments, the transmission rod 2 is integrally formed. The end of the transmission rod 2 away from the brush head assembly 3 has a horizontal end face, which may be adapted to a common transmission structure. The transmission rod 2 is made of magnetizable metal at least at the input end. In other embodiments, the transmission rod 2 is made of plastic material mixed with magnetic powder at least at the input end. That is, the input end of the transmission rod 2 can be connected and fixed to the output end of the transmission structure by magnetic attraction.

Figure 11:
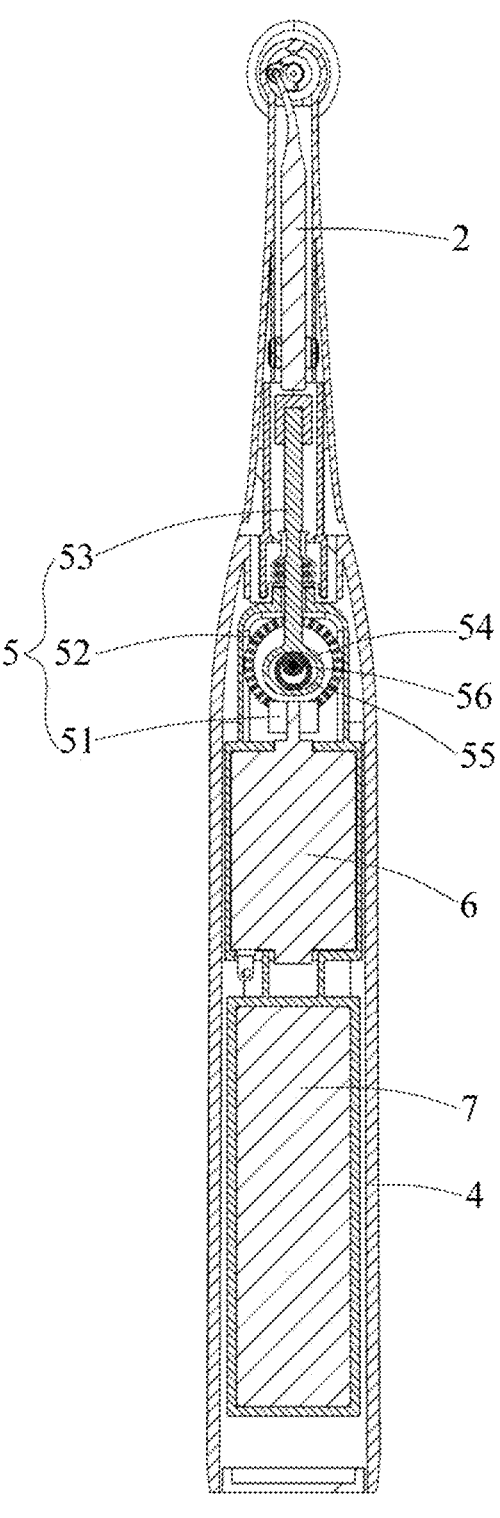
FIG. 11 is a schematic view of an internal structure of an electric oral cleaning tool and a handle that are in an assembled state according to some embodiments of the present disclosure.

Referring to FIG. 11, a handle 4 is configured to be assembled with the electric oral cleaning tool, which is connected to a lower end of the housing 1. The handle 4 is arranged with a transmission mechanism 5 and a motor 6.

An output end of the motor 6 is connected to a proximal end of the transmission mechanism 5. A battery 7 is further arranged inside the handle 4. The battery 7 is disposed on a lower end of the motor 4 and is electrically connected to the motor 4. Specifically, the transmission mechanism 5 includes a driving gear 51, a driven gear 52, and a transmission rod 53. The driving gear 51 is sleeved on an output shaft of the motor 6 and rotatable together with the output shaft of the motor 6. The motor 6 is fixedly connected to an inner wall of the handle 4, and the output shaft of the motor 6 is arranged in the same direction as the handle 4, specifically, arranged upward along the length direction of the handle 4. The driving gear 51 is horizontally connected to the output shaft of the motor 6. The driven gear 52 is a bevel gear, and the driven gear 52 and the driving gear 51 are perpendicular to each other. The driven gear 52 meshes with the driving gear 51, converting the horizontal rotation into vertical rotation. The transmission rod 53 is transmission-connected to the driven gear 52. The motor 6 is configured to drive the driving gear 51 to rotate horizontally, which drives the driven gear 52 to rotate vertically, and then the driven gear 52 drives the transmission rod 53 to reciprocate up and down.

Specifically, a lower end of the transmission rod 53 is arranged with a sleeve 54, and the driven gear 52 is arranged with an eccentric post 55, the sleeve 54 being sleeve-fitted with the eccentric post 55. The driven gear 52 is arranged with a transverse rotating shaft 56, the rotating shaft 56 penetrating along the axial direction of the eccentric post 55 and passes through a bottom of the sleeve 54. Both ends of the rotating shaft 56 are rotatably connected to the inner wall of the handle 4 to support the rotation of the driven gear 52. The driven gear 52 drives the eccentric post 55 to rotate around the rotating shaft 56, and the sleeve 54 oscillates up and down with the rotation of the eccentric post 55, which in turn can drive the transmission rod 53 as a whole to reciprocate up and down. An upper end of the transmission rod 53 is arranged with a magnetic connecting portion 57 for magnetic connection with the transmission rod 2. Since a proximal end of the transmission rod 2 is a magnetizable material, the transmission rod 53 can ultimately realize the function of driving the functional element 31 to swing and clean the user's oral cavity.

Figure 12:
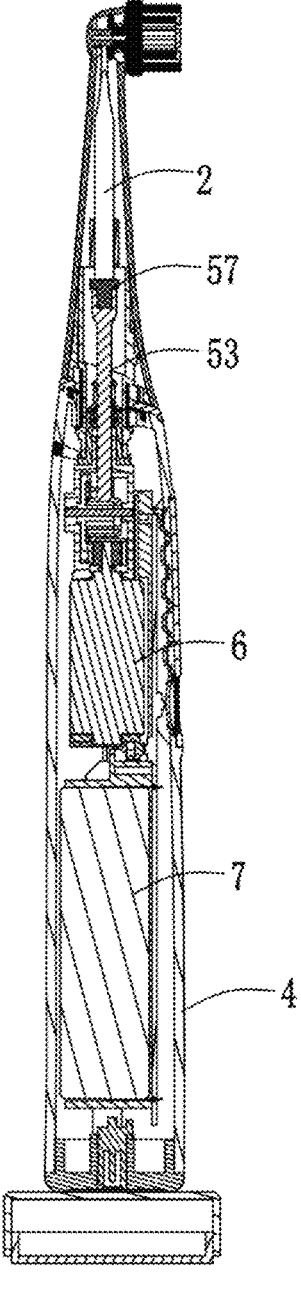
FIG. 12 is a cross-sectional schematic view of an electric oral cleaning tool and a handle that are in an assembled state according to some embodiments of the present disclosure.
Figure 13:
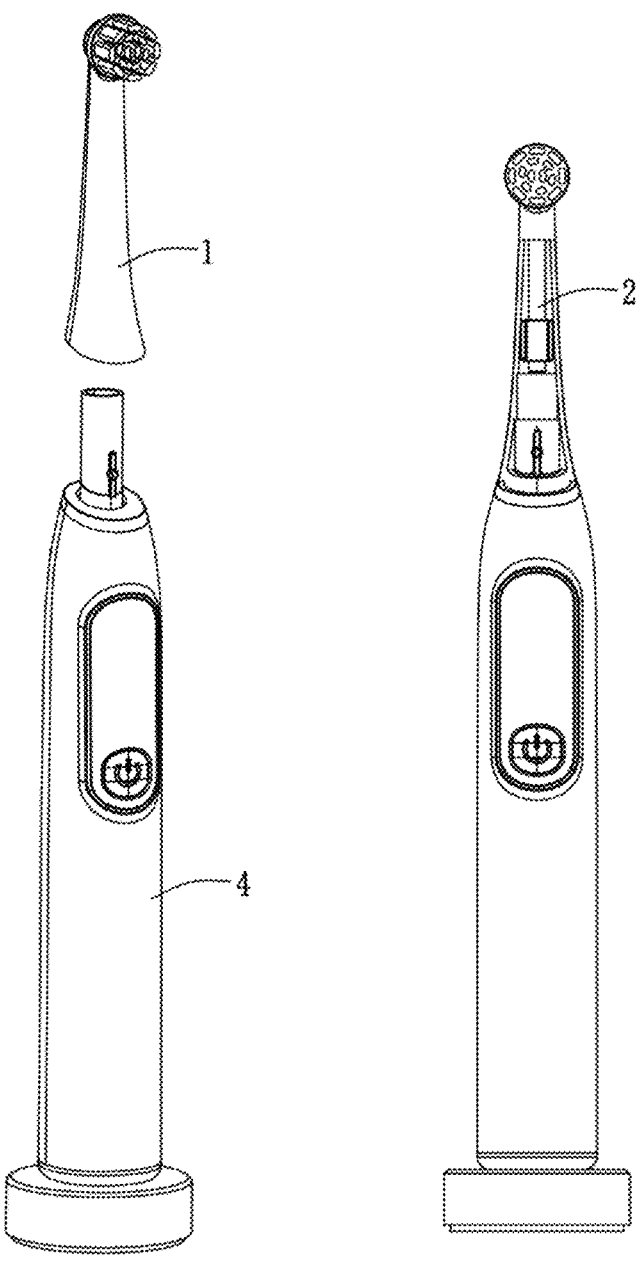
FIG. 13 is a schematic view illustrating an assembled state and a disassembled state between an electric oral cleaning tool and a handle according to some embodiments of the present disclosure.

The transmission mechanism 5 has a magnetic connecting portion, and the magnetic attraction force between the proximal end of the transmission rod 2 and the magnetic connecting portion is set between 3.5N and 35N, preferably between 3.5N and 20N, for example 15N. When the magnetic attraction force is set to 15N, the connection strength of 15N prevents the toothbrush from falling off during vibration. In addition, when an adult uses the cleaning tool, he/she can still easily pull it off, whereas when a child normally uses the cleaning tool and needs to change the toothbrush head, he/she can pull it off with maximum force. More specifically, as shown in FIGS. 12 and 13, which show a situation when the brush head and the handle are connected, when the brush head and handle are connected, two forces act to achieve the connection between the brush head and handle. One is the fastening force between the brush head and handle, and the other is magnetic force between the proximal end and the magnetic connecting portion.

TABLE 1

Tests of the actual insertion and pulling forces of the brush head
and handle (including the fastening force and magnetic force)

| No. | Insertion force (N) | | | | | Pulling force (N) | | | | |
| --- | --- | --- | --- | --- | --- | --- | --- | --- | --- | --- |
| | $1^{st}$ time | $2^{nd}$ time | $3^{rd}$ time | $4^{th}$ time | $5^{th}$ time | $1^{st}$ time | $2^{nd}$ time | $3^{rd}$ time | $4^{th}$ time | $5^{th}$ time |
| Brush head 1# | 7.8 | 7.1 | 6.8 | 8.32 | 7.2 | 14.9 | 13.4 | 13.9 | 13.4 | 13.3 |
| Brush head 2# | 8.4 | 9.3 | 7.7 | 8.3 | 9.4 | 18.8 | 19.8 | 18.2 | 18.5 | 17.6 |
| Brush head 3# | 7.4 | 6.9 | 7.8 | 7.4 | 7.9 | 18.9 | 19.2 | 19.5 | 20.1 | 19.6 |
| Brush head 4# | 8.2 | 9.2 | 8.3 | 7.9 | 8.8 | 13.8 | 14.5 | 13.6 | 15.1 | 14.8 |
| Brush head 5# | 8.3 | 7.8 | 8.5 | 9.4 | 9.2 | 16.8 | 18.2 | 17.5 | 17.3 | 17.5 |

TABLE 2

Tests of the fastening insertion and pulling forces of the
brush head and handle (including the fastening force only)

| No. | Insertion force (N) | | | | | Pulling force (N) | | | | |
| --- | --- | --- | --- | --- | --- | --- | --- | --- | --- | --- |
| | $1^{st}$ time | $2^{nd}$ time | 3次 | $1^{st}$ time | $2^{nd}$ time | 1次 | $1^{st}$ time | $2^{nd}$ time | 4次 | $1^{st}$ time |
| Brush head 1# | 7.8 | 7.1 | 6.8 | 8.32 | 7.2 | 7.8 | 7.5 | 6.8 | 8.8 | 7.5 |
| Brush head 2# | 8.4 | 9.3 | 7.7 | 8.3 | 9.4 | 8.3 | 8.9. | 6.7 | 8.5 | 9.2 |
| Brush head 3# | 7.4 | 6.9 | 7.8 | 7.4 | 7.9 | 7.3 | 7.9 | 7.8 | 7.5 | 7.8 |
| Brush head 4# | 8.2 | 9.2 | 8.3 | 7.9 | 8.8 | 8.4 | 9.2 | 8.8 | 8.9 | 7.9 |
| Brush head 5# | 8.3 | 7.8 | 8.5 | 9.4 | 9.2 | 8.9 | 8.7 | 8.5 | 9.2 | 9.2 |

TABLE 3

| No. | Insertion force (N) | Pulling force (N) |
|---|---|---|
| Tests of the magnetic insertion and pulling forces of the brush head and handle (including the magnetic force only) | | |
| Brush head 1# | / | 9.2 |
| Brush head 2# | / | 12.5 |
| Brush head 3# | / | 13.8 |
| Brush head 4# | / | 14.6 |
| Brush head 5# | / | 15.1 |

From the above test data, it can be seen that the average fastening insertion and pulling force is about 7-8N, and the average magnetic insertion and pulling force is about 9-15N. Therefore, the actual insertion and pulling forces of the brush head and handle mainly relies on the fastening insertion and pulling force.

TABLE 4

| No. | Insertion force (N) | Pulling force (N) |
|---|---|---|
| Maximum or acceptable pulling force for normal use by adults (maximum insertion force is not tested here because insertion force has nothing to do with magnetic attraction) | | |
| Adult male 1 | / | 45 |
| Adult male 2 | / | 45 |
| Adult male 3 | / | 45 |
| Adult male 4 | / | 45 |
| Adult male 5 | / | 45 |
| Adult female 1 | / | 40 |
| Adult female 2 | / | 40 |
| Adult female 3 | / | 40 |
| Adult female 4 | / | 40 |
| Adult female 5 | / | 40 |

TABLE 5

| No. | Insertion force (N) | Pulling force (N) |
|---|---|---|
| Maximum or acceptable pulling force for normal use by 6-year-old children (maximum insertion force is not tested here because insertion force has nothing to do with magnetic attraction) | | |
| Child 1 | / | 28 |
| Child 2 | / | 28 |
| Child 3 | / | 28 |
| Child 4 | / | 28 |
| Child 5 | / | 28 |

From the results in Tables 1 to 5 above, it can be concluded that the fastening insertion and pulling force is 7-8N. After subtracting this force, the maximum force that adults can basically accept is basically within 35N, and that for children is within 20N. In other words, 20N is the optimal force for both adults and children to be able to replace toothbrush heads normally and with a high connection strength.

Obviously, the above-described embodiments are only some, but not all, embodiments of the present disclosure. The drawings show some embodiments of the present disclosure, but do not limit the scope of the present disclosure. The present disclosure can be implemented in many different forms. On the contrary, these embodiments are provided to facilitate a more thorough understanding of the present disclosure. Although the present disclosure has been described in detail with reference to the foregoing embodiments, for those skilled in the art, they can still modify the technical solutions described in the foregoing specific embodiments or replace some of the technical features with equivalents. Any equivalent structure that makes direct or indirect use of the content of the description and drawings of the present disclosure in other related technical fields is also within the scope of the present disclosure.

What is claimed is:

1. An electric oral cleaning tool, comprising: a housing, a transmission rod, and a brush head assembly;
   wherein the brush head assembly is rotatably connected to an end of the housing, and a functional element is arranged on a side of the brush head assembly; a movable disk is arranged on another side of the brush head assembly, and the movable disk has a mating area offset from a center of the brush head assembly;
   the transmission rod is arranged in the housing and has an input end and an output end; the output end is eccentrically arranged relative to the input end in an axial direction of the transmission rod; the input end is configured to be connected to a transmission mechanism, the output end is directly connected to and matched with the mating area; and the output end is located within the mating area, in condition of the output end reciprocating with a variable diameter relative to a center of the movable disk, the output end moves linearly to directly drive the mating area to oscillate reciprocally and cause the brush head assembly to oscillate reciprocally; the variable diameter refers to a fact that a distance between the output end and the center of the movable disk changes during the reciprocating of the output end;
   the transmission rod is integrally formed or at least the input end is integrally formed with the transmission rod;
   the transmission rod or at least the input end is made of magnetizable material; and
   the mating area is a groove, and the output end is arranged with a guide rod; the guide rod is disposed in the groove; a minimum distance between a center point of the guide rod and a central axis of the input end is 1.5-4.5 mm.

2. The electric oral cleaning tool according to claim 1, wherein a distance between the guide rod and the center of the brush head assembly is 2 mm-4 mm.

3. The electric oral cleaning tool according to claim 2, wherein the guide rod extends with a connecting block at an end away from the brush head assembly, and an inner side of the housing defines a limit groove; the connecting block is disposed in the limit groove and is movable longitudinally in the limit groove.

4. The electric oral cleaning tool according to claim 1, wherein the output end is connected to the input end by means of a bending, a welding, or a fitting, and a projection of the output end is "L"-shaped or "T"-shaped or grooved shape.

5. The electric oral cleaning tool according to claim 1, wherein the transmission rod or at least the input end is made of a plastic material mixed with magnetic powder.

6. The electric oral cleaning tool according to claim 1, wherein a guide ring is fixed to an inner wall of the housing, and the transmission rod passes through the guide ring and is capable of reciprocating longitudinally within the guide ring.

7. The electric oral cleaning tool according to claim 1, wherein a maximum longitudinal travel of the transmission rod is 1-5 mm, and a rotation angle of the brush head assembly is between −38° and 38°.

8. The electric oral cleaning tool according to claim 1, wherein a magnetic adsorption force of the output end is between 3.5N and 35N.

9. An electric toothbrush, comprising the electric oral cleaning tool of claim 1.

10. An electric oral cleaning tool, comprising: a housing, a transmission rod, and a brush head assembly;

wherein the brush head assembly is rotatably connected to an end of the housing, and a functional element is arranged on a side of the brush head assembly; a movable disk is arranged on another side of the brush head assembly, and the movable disk has a mating area offset from a center of the brush head assembly;

the transmission rod is arranged in the housing and has an input end and an output end; the output end is eccentrically arranged relative to the input end in an axial direction of the transmission rod; the input end is configured to be connected to a transmission mechanism, the output end is directly connected to and matched with the mating area; and the output end is located within the mating area, in condition of the output end reciprocating with a variable diameter relative to a center of the movable disk, the output end moves linearly to directly drive-the mating area to oscillate reciprocally and cause the brush head assembly to oscillate reciprocally; the variable diameter refers to a fact that a distance between the output end and the center of the movable disk changes during the reciprocating of the output end;

the transmission rod is integrally formed or at least the input end is integrally formed with the transmission rod;

the transmission rod or at least the input end is made of magnetizable material; and the mating area is a fixing rod, and the output end defines a connecting hole; the fixing rod is disposed in the connecting hole; when the output end moves longitudinally and drives the connecting hole to move longitudinally, the fixing rod moves transversely in the connecting hole.

11. An electric oral cleaning tool, comprising: a housing, a transmission rod, and a brush head assembly;

wherein the brush head assembly is rotatably connected to an end of the housing, and a functional element is arranged on a side of the brush head assembly; a movable disk is arranged on another side of the brush head assembly, and the movable disk has a mating area offset from a center of the brush head assembly;

the transmission rod is arranged in the housing and has an input end and an output end; the output end is eccentrically arranged relative to the input end in an axial direction of the transmission rod; the input end is configured to be connected to a transmission mechanism, and the output end is matched with the mating area; the output end is configured to drive the mating area and the brush head assembly to oscillate reciprocally;

the transmission rod is integrally formed or at least the input end is integrally formed with the transmission rod;

the transmission rod or at least the input end is made of magnetizable material; and the mating area is a groove, the output end is arranged with a guide rod; the guide rod is disposed in the groove, and a minimum distance between a center point of the guide rod and a central axis of the input end is 1.5-4.5 mm.

12. An electric toothbrush, comprising the electric oral cleaning tool of claim 11.

* * * * *